United States Patent [19]

Kossor

[11] 3,913,200

[45] Oct. 21, 1975

[54] TAPE CASSETTE INDEX SYSTEM

[76] Inventor: Albert A. Kossor, 13 N. 12th St., Kenilworth, N.J. 07033

[22] Filed: Nov. 8, 1973

[21] Appl. No.: 413,931

[52] U.S. Cl. .............. 29/169.5; 29/407; 116/129 C; 242/199; 360/137

[51] Int. Cl.[2] .................... B23Q 17/02; G09F 9/00

[58] Field of Search .......... 116/129 C, 129 H, 67 A, 116/124 R, 114 J, 135, 114 R; 360/96, 132, 137; 352/172; 242/57, 199; 29/407, 169.5

[56] References Cited

UNITED STATES PATENTS

| | | | |
|---|---|---|---|
| 2,802,290 | 8/1957 | Carey | 116/67 A |
| 2,937,818 | 5/1960 | Zorn | 242/199 |
| 3,074,546 | 1/1963 | Burgess et al. | 116/114 J |
| 3,471,096 | 10/1969 | Hancock | 360/132 X |
| 3,495,229 | 2/1970 | Kuehnle | 360/96 X |
| 3,590,771 | 7/1971 | Lutsch | 352/172 X |
| 3,734,052 | 5/1973 | Feldman | 116/135 |

FOREIGN PATENTS OR APPLICATIONS

| | | | |
|---|---|---|---|
| 251,260 | 8/1927 | United Kingdom | 116/129 C |

*Primary Examiner*—Richard C. Queisser
*Assistant Examiner*—Daniel M. Yasich
*Attorney, Agent, or Firm*—Martha G. Pugh, Esq.

[57] ABSTRACT

A position marking or indexing system is incorporated into a tape dispensing cartridge, more particularly for use in a magnetic tape audio or digital recording-reproducing system. The indexing system comprises a pair of circular dials respectively disposed in off-set relation on opposite sides of the cassette housing, each revealing an indicator which moves in an internal groove to execute a spiral path in coordination with the traverse of the tape. The area adjacent the indicator spiral is adapted to receive marks in pencil or other erasable or removable medium. The indicator body is carried in the radial slot of an internal annular disk in the form of a spur gear with external teeth which is spring loaded to mesh with mating internal gear teeth of an outer rim in the form of a ring gear which is part of the cassette housing proper, substantially concentric with one of the tape reels. The loading spring, which bears against the inner periphery of the annular disk, is fastened to the outer periphery of a raised rim hub on the tape reel. The inner surface of the hub is provided with projections which engage ribs on the tape drive spindles of the recording-reproducing machine. The spindles function to center and drive the index system and to carry the transmitted spring load, leaving the internal tape wound reel friction free in a manner conventional to tape cassettes designed for up to one hour playing time.

17 Claims, 7 Drawing Figures

TAPE CASSETTE INDEX SYSTEM

BACKGROUND OF THE INVENTION

This relates in general to indexing employed in connection with tape reel systems and, more particularly, to position indicating and indexing techniques and apparatus adapted for use on tape cassette cartridges of the type employed with magnetic tape recording and reproducing systems.

Conventional magnetic tape cartridges comprise a pair of reels, one loaded with a roll of tape, mounted in spaced apart relation respectively concentric with a pair of circular openings in a rigid housing. The openings are designed to slip over and engage the hubs of the reels with a pair of driving spindles mounted on a conventional type recording-reproducing machine.

A problem arises as the tape is unwound from one reel and wound up on the other reel, of precisely identifying specific portions of the tape which one might wish to replay or on which one might wish to make corrections or commence to record. A number of different types of prior art systems are available for measuring a specific length of tape by making crude indications on detachable cards for identifying specific portions of the tape, or for providing digital information based on the number of rotations of the reels, using a reel-to-reel drive, providing a separate motor for each reel. The foregoing types of devices are for the most part mechanically complex and imprecise in identifying the area at which it is wished to replay the tape.

SUMMARY OF THE INVENTION

Accordingly, it is the principal object of the present invention to provide improvements in means for indexing and identifying precise positions in the traverse of magnetic tapes. Another object of the invention is to provide indexing means having higher precision than available with prior art indexing systems. A further object of the invention is to provide indexing means which are mechanically simple compared with the complex indexing systems of the prior art.

A further object of the invention is to provide an indexing system specifically adapted for use with standard tape cassettes which require minimal mold revisions and few additional parts.

These and other objects are available in the tape cassette indexing and position marking system in accordance with the present invention. This utilizes as its basic principle the differential in rotation between a fixed outer rim embossed on the faces of the cassette housing and a pinion type annular inner disk which is forced to roll against the internal wall of the fixed rim by compression of a light spring coupled to the hub of the tape reel. The disk is slotted radially to include a slidable indicator whose projection moves in a spiral groove on the indicator face.

In the present embodiment, the indexing system comprises a pair of circular faces of frosted plastic or the like, each of which is disposed on one side of the cassette cartridge in substantially concentric relation with one of the enclosed tape reels. In each case the annular inner disk has peripheral outer teeth which are compressed in mating relation against a series of inwardly directed teeth on the inner surface of the fixed annular rim on the face of the cassette. The spring attached to the periphery of each of the reel hubs rides on the edge of the inner hole of the annular disk which fits over the respective reel hub. The hubs, which are equipped with a series of inwardly directed radial sprockets, are designed to fit over and engage in driven relation the spindles of a conventional tape recording-reproducing machine.

Thus it will be seen, if the outer fixed annular rim has 240 teeth, as in the present example, and the inner annular disk has 238 teeth, the rotation of the inner disk relative to the fixed outer rim for each complete rotation of the reel hub would be two teeth in a reverse direction to the hub rotation.

The reverse motion of the inner disk with reference to the fixed annular rim is utilized for indexing purposes by interposing an indicator body in slidable relation in a radial slot in the disk. The indicator has a finger which engages a spiral inner groove visible on the indexing face and is adapted to move through 2.61 revolutions as the tape is completely unwound from one reel and wound onto the other reel. The frosted indicator surface adjacent the spiral indicator path is adapted to receive markings of pencil or other erasable media.

Particular advantages of the present invention are its mechanical simplicity, the fact that it can be readily incorporated into any standard type cassette with minimal mold revisions and only a few additional parts; and that its use necessitates only a slight modification of the housing mold of any standard recording-reproducing device. A further advantage is that a precise indexing system is provided which is integral with the cassette.

These and other objects, features and advantages of the invention will be better understood from a detailed study of the invention with reference to the drawings hereinafter and the detailed description of the invention.

DETAILED DESCRIPTION OF THE DRAWINGS

Figures 1, 5C:
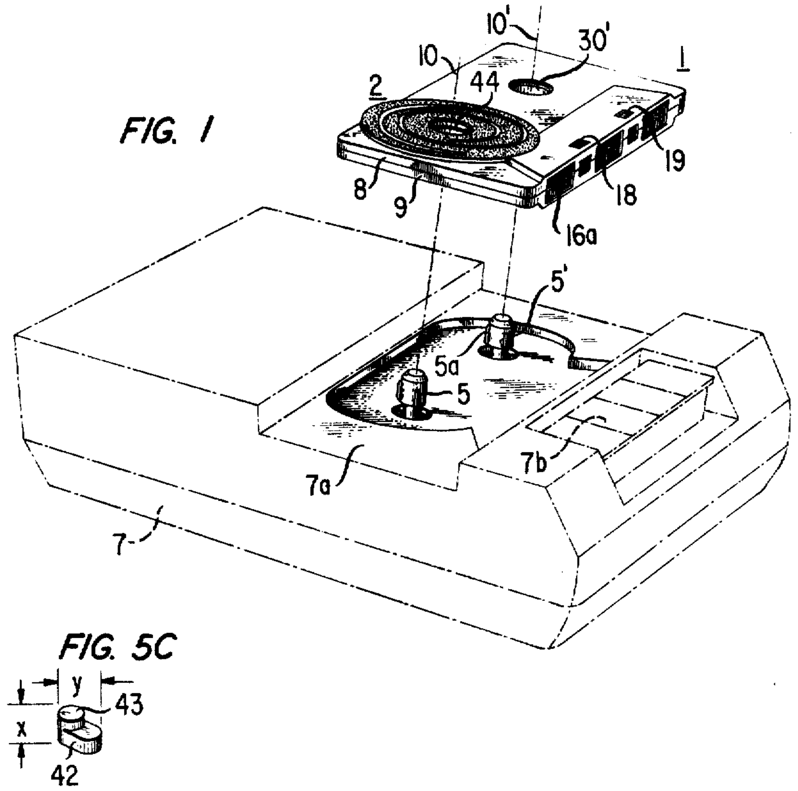
FIG. 1 is a showing in perspective of a standard type tape cassette equipped with an indexing system in accordance with the present invention, being fitted onto a conventional recording and reproducing unit.
FIG. 5C is a detailed showing of the indicator device, the body of which rides in a radial slot on the indicator disk and the vertical projection of which rides in the internal spiral groove on the underside of the indicating face of FIG. 5A.

Referring in detail to FIG. 1 of the drawings, there is shown a standard magnetic tape cassette cartridge 1 which has been modified in accordance with the present invention to contain a spiral indexing system 2 on both sides of a reversible cartridge (the underside not being shown). In the present illustrative example the cartridge 1 is of typical rectangular design, 2½ inches wide and 4 inches long, formed in a conventional manner of molded plastic such as, for example, polystyrene, acrylonitrile butadiene styrene or similar materials. Cartridge 1 is constructed to include a pair of symmetrically centered openings 30, 30', each constructed to fit over capstan spindles 5, 5' protruding from a well 7a of a recording-reproducing machine 7. The latter, not being part of the invention, is indicated in phantom. It may be of any of the types well-known in the art which are adapted to accommodate standard magnetic tape cassettes of the form generally available on the market. In the present illustrative example, tape cassette 1 is adapted to play one-quarter hour on one side and another quarter-hour on the second side by reversing the cartridge. This is done in the conventional manner by turning the cartridge over and from left to right on the same pair of capstan spindles 5, 5' on the machine 7 which includes a conventional motor-driven mechanism for driving the spindles 5, 5'. The latter operate for winding and unwinding the magnetic tape 16a on which audible signals are recorded (or from which they are reproduced) as the tape passes adjacent the recording-reproducing head (not shown), depending on the setting of the conventional control buttons 7b. The windows 18 and 19 are prior art locator holes to center the spring-loaded cassette against conventional pins (not shown) in the recording-reproducing machine 7.

Figure 2:
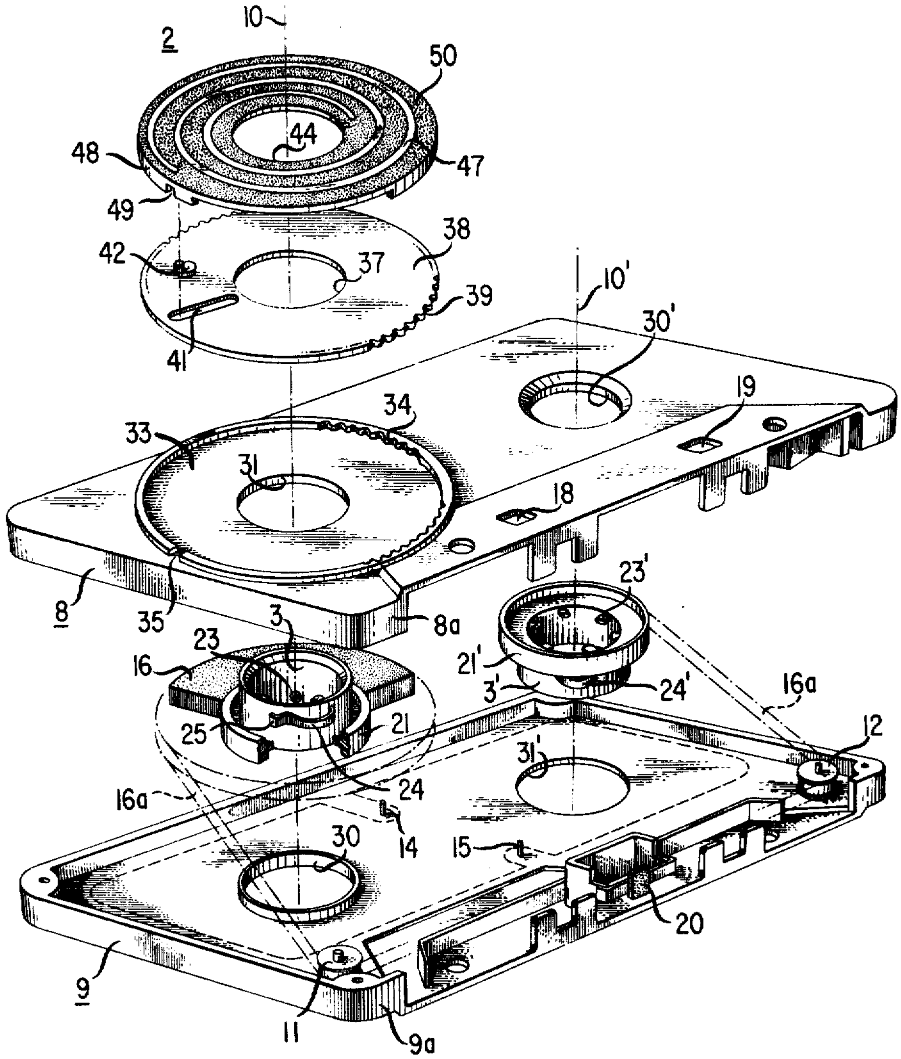
FIG. 2 is an exploded view of the tape cassette of FIG. 1, showing how the indexing system is coordinated with the standard cassette elements.
Figure 3:
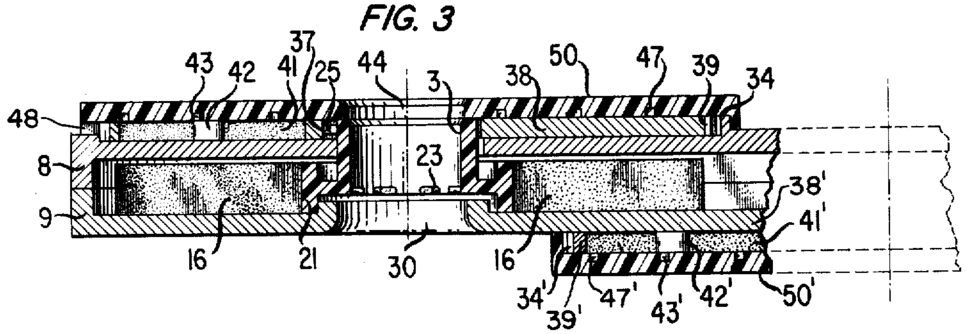
FIG. 3 is a showing in cross-section of the assembled tape cassette of FIG. 1, including the indexing elements.

FIG. 2 of the drawings shows the cassette housing 1 separated into two housing halves 8 and 9, showing in exploded view the component parts of the spiral indexing system 2 which, for convenience, is described with reference to the left-hand side only of the composite. (See FIG. 3.) In the specification hereinafter and as shown in the drawings, fittings associated with the upper left-hand side of the housing will be correspondingly numbered to their mirror image counterparts on the right-hand lower side of the housing; and, insofar as the latter fittings are shown, their number designations will be primed.

For simplifying the drawings and description and to avoid unnecessary repetition, only those elements on the underside represented by the primed numbers have been shown and described which are necessary to a complete description of the elements on the upper side.

The bottom housing half 9 of cassette 1, when in open position, reveals a pair of circular openings 30, 31' which are conventionally 27/64 inch in diameter and are respectively concentric with the centerlines 10, 10', each of the respective centers being conventionally located the same distance in from its adjacent end and centered between the two sides. Opening 30 has a conventional inwardly directed rim 3/64 inch wide and 3/64 inch above the flat interior to accommodate the floatation of conventional tape reel 21 which is 9/16 inch in inner diameter, 1.39 inches in outer diameter and 5/32 inch thick. Reel 21 carries the roll of magnetic tape 16, which is conventionally 5/32 inch wide. Concentrically supported by an inwardly directed lateral flange within the reel 21 is the lower end of the hub 3 which is 17/32 inch in outer diameter, 13/32 inch in inner diameter and extends 0.266 inch parallel to its major axis. The bottom edges of the wheel 21 and the hub 3 project downwardly (as shown in the drawing) to form between them an annular groove which fits over and rides on the outer periphery of the raised inner rim of opening 30, the latter serving as a bearing for the rotation of tape wheel 21. On the inner periphery of the raised-rim hub 3, about 5/64 inch from its lower end, are provided six symmetrically spaced, inwardly directed radial projections 23 which are designed to accommodate between them the three projections 5a of the spindle 5 when the cassette 1 is in conventional position on the latter. (See, FIG. 1) The width of projections 5a on spindle 5 and the circumferential distance between adjacent pairs of projections 23 are conventionally designed to provide a degree of "float" to compensate for eccentricities in the conventional system. On the outer periphery of raised-rim hub 3, about 0.025 inch below its upper edge, it carries a hair spring 24 attached at one end. The latter, which may be formed, for example, of beryllium, copper, stainless steel or the like, is roughly 0.025 inch wide and 0.010 inch thick, spirally projecting outward approximately 100° to its tip 25, which is depressed to permit housing half 8 to fit in a conventional manner against housing half 9.

The upper housing half 8, which is conventionally designed to match with lower housing half 9, is equipped with a pair of circular openings 3 and 30', each 27/64 inch in diameter and concentric with the respective centerlines 10, 10'. When cassette 1 is assembled, openings 31, 30' are matched with the respective openings 30, 31' on the lower housing half 9. When the internal groove of tape wheel 21 is journalled on the rim of opening 30, raised-rim hub 3 protrudes through opening 31. This is characterized by the same degree of concentric floatation as reel 21' with the rim of opening 31' on the bottom housing half 9. (FIG. 2) Opening 31 is surrounded concentrically on the surface of housing half 9 with a fixed annular rim 33, the periphery of which is 2⅛ inches in outer diameter and 0.062 inch high, which is provided with 240 inwardly directed gear teeth 34 which function in the manner of a ring gear. Gear teeth 34 extend around the inner periphery of the fixed annular rim 33, which is interrupted by a notch 35 which is 1/16 inch wide.

An annular gear disk 38, having an outer diameter of 1.986 inches and a thickness of 0.050 inch, has a central circular inner opening 37 which is 11/16 inch in diameter. It is equipped with 238 peripheral teeth 39 which are designed to mesh with the teeth 34 of fixed annular rim 33. In the present embodiment, teeth 34 are formed with a standard involute 20° pressure angle, 120 diametral pitch, and are of standard American Gear Manufacture for internal spur gears. Teeth 39 have 120 diametral pitch and are of special form, 0.012 inch tooth depth, 60° included tooth angle and approximately 0.007 inch top and bottom lands to insure freedom of engagement or disengagement of several teeth simultaneously in an arc mesh at successive points of peripheral rotation with teeth 34.

After tape 16a has been threaded in the normal manner around the rollers 11 and 12 adjacent the magnetic head 20 in the lower housing half 9 and the end conventionally secured on the wind-up tape wheel 21', the spring tip 25 is momentarily depressed to allow opening 31 in housing half 8 to clear spring tip 25. The cassette is then completely assembled in closed relation, as shown in section in FIG. 3, the spring tip 25 slidably engaging the inner periphery of the opening 37 of the disk gear 38.

Referring again to FIG. 2 for clarity, this causes the peripheral teeth 39 of the disk 38 to mesh at successive points with the teeth 34 of the fixed annular rim 33, in the manner of a ring gear as explained.

The basic principle of the system utilizes the rotational differential between the fixed annular rim 33, an integral part of the cassette housing half 8, and the disk 38. The latter is caused to rotate by compression of the tip 25 of hair spring 24 bearing against its inner edge as the hub 3 is rotatably driven by projections 5*a* on the spindle 5. (See, FIG. 1) The spring 24, rotating at the same rate as the tape wheel 21, causes the disk gear 38 to rotate in an opposite direction through an arc equal to the differences in the circumferences of the disk 38 having teeth 39 and the fixed annular rim 33 having teeth 34. In this case, since the fixed annular rim 33 has 240 teeth 34 and the disk 38 has 238 teeth 39, every time reel 21 executes a complete rotation, disk gear 38 makes a traverse around fixed annular rim 33 which is two teeth short of completion. Hence, gear disk 38 moves two teeth in a reverse direction on the teeth 34 of fixed annular rim 33, and vice versa, when the motion is reversed. This gives a gear ratio of 120 to 1.

The annular gear disk 38 is provided with a radial slot 41, which is 0.045 inch wide and 0.54 inch long and extending through its thickness. The latter is constructed to accommodate an index indicator body 42 having a vertical projecting finger 43, in the form of a cylinder of 0.040 inch diameter. Indicator 42 is shown and described in detail with reference to FIG. 5C of the drawings. The base 42, which is 0.040 inch by 0.120 inch, fits slidably into the slot 41, with the cylindrical finger 43 projecting into the spiral groove 47 of the indicator face 50. The configuration of the latter will be discussed in detail with reference to FIG. 5A, which is an enlarged showing of the same in plan view, and FIG. 5B, which shows the same in section. The indicator face 50 is an annular disk concentric with centerline 10, which has a circular inner opening 44, which is ½ inch in diameter and which is 2 5/32 inches in outer diameter.

The indicator face 50 comprises a spiral writing surface, preferably of translucent frosted plastic or the like, which is adapted to receive notations in pencil or other media which can readily be erased. Indicator face 50 has a downwardly projecting peripheral flange 48, which is 0.015 inch wide and 0.060 inch deep, containing a notch 49, which is 1/16 inch wide and 0.060 inch deep and adapted for alignment with the notch 35 on the periphery of rim 33. (See the exploded view, FIG. 2.) Flange 48 indicator face 50 is constructed to just fit over and be accommodated by snap locking it against the fixed annular rim 30 having gear teeth 34.

The function of notch 49 in flange 48 of indicator face 50 and notch 35 in rim 33 is to permit entry of a small implement, such as a toothpick, to engage the teeth 39 of disk 38 to manually rotate the latter to a desired position with reference to indicator face 50. Thus, the teeth 39 of disk 38 can be shifted relative to teeth 34 of the fixed annular rim 33 so as to synchronize a position on the audio tape with the index marker, or projection 43, or to properly align the starting point of the index system with the starting point of the audio tape. Such orientation may be necessitated if the start of the tape is assembled out of phase with the starting point of the index, or be relatively displaced because of shock or rough handling of the cassette.

An alternative method of phase synchronization, which may be preferred to the foregoing, is achieved by simply rotating the snap-on writing surface of indicator face 50 relative to the body of the cassette to coincide with a selected audio signal on the tape. The flange 48 of indicator face 50 is frictionally coupled against the fixed annular rim 33 of teeth 34. Manual adjustment of indicator face 50 does away with the need for the notches 49 and 35.

Figure 5B:
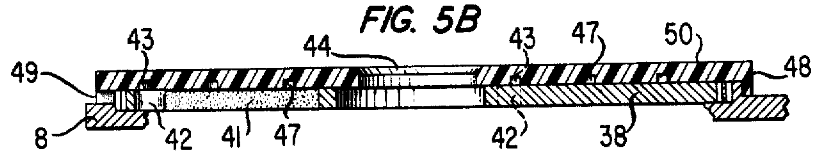
FIG. 5B is a cross-sectional view of the indicating face of FIG. 5A.
Figure 5A:
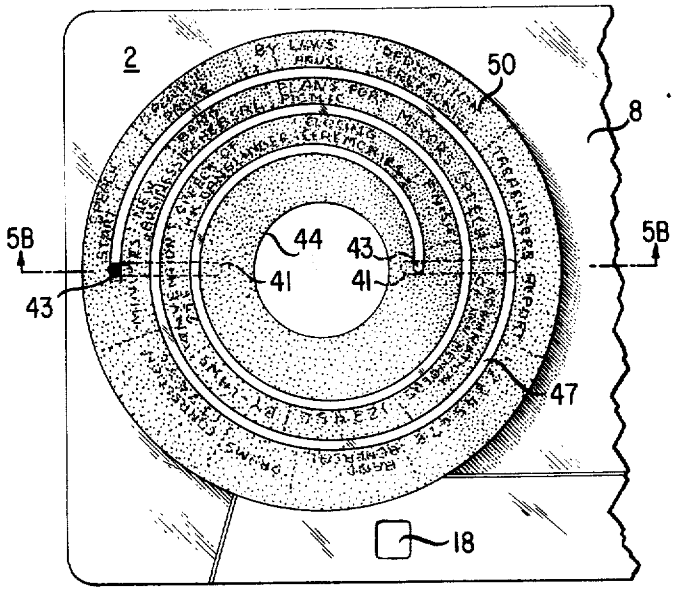
FIG. 5A is a plan view of the indicating face of the combination shown in FIGS. 1–4, indicating erasable markings on the surface.

Referring to FIGS. 5A, 5B and 5C, the face 50 of indexing system 2 is concentric with centerline 10. The view, as shown, is drawn approximately to scale. The indicator face 50, which is preferably of plastic such as polystyrene, is approximately 2 5/32 inches in diameter. The groove 47, which is approximately 0.045 inch wide, starts at a point approximately 5/32 inch from the external periphery of the face. It traverses a spiral path, making about 2½ revolutions around the circle, and terminates at approximately a diametrically opposite point 3/16 inch in from the edge of inner opening 44. The latter is about ½ inch in diameter. The spiral area, approximately 0.125 inch wide, which is formed between the transparent convolutions of the spiral 47, is frosted on the surface (by etching, masked sand blasting, etc.) to give a matte finish. This finish is designed to accommodate writings in pencil or other erasable media.

FIG. 5C is a detailed showing of the indicator 42, 43. Assuming $y$ equals the length of the base and $x$ equals the height of projection 43, $y$ is equal to $2x$. Base 42, which is 0.120 inch long and 0.040 inch wide, is designed to fit slidably in slot 41 of disk gear 38. Projection 43, which may, for example, take the form of a small, red cylinder 0.040 inch in diameter and integral with one end of the base member 42, is designed to just fit movably in slot 47. The indicator 43 is designed to make 2.61 revolutions around the spiral path 47 for the playing of a 15 minute tape on each side of the cassette, providing a ratio of tape length to indexing length of 120 to 1. This ratio can be increased or decreased by changing the gearing. It is contemplated that the tape reels in the embodiment under description will be driven at the standard speed of 48 revolutions per minute, although, obviously, the indexing system of the present invention can be applied to systems operating at any of the conventional speeds of revolution.

The following Table I is a summary of data relating to the specific model under description.

TABLE I

| | |
|---|---|
| Outer diameter reel 21 | 1.39" |
| Total diameter with tape roll 16 wound on above | 1.840" |
| Tape thickness (approximate) | 0.00073" |
| Tape length | 132'= 1584.0" |
| Tape playing time | 15 minutes on a side |
| Circumference of spiral index 47 | 1.1'= 13.2" |
| Ratio of tape length to spiral length | 132/1.1 = 120:1 |
| Gear ratio (33/39) | 120:1 |
| Travel of indicator 43 in spiral 47 | 940° = 2.61 revolutions. |

With the tape 16 fully wound on reel 21, at its starting position on the left-hand side, and the index marker 43 at its starting position, the opposite side of the tape attached to reel 21' will be at its end, with the corresponding indicator 43' on the other side of the cassette at its end position. (See, FIG. 2) As the tape and index marker 43 on the left-hand side of the cassette reach their end positions (first half of tape recorded), the indicator marker 43' on the opposite side of the cassette will have reached its starting position (upon turnover of the cassette).

The center of the disk wheel assembly 38 is forced to a slightly eccentric position relative to centerline 10 of the housing 8, 9 because of the action of spring-loaded tip 25 bearing against the surface of the opening 37 as the tape wheel rotates within the internal cassette. It will be apparent that a similar condition will exist with reference to disk 38' on the other side of the cassette.

Figure 4:
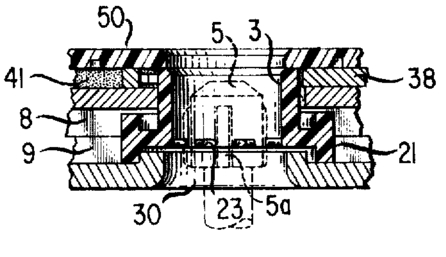
FIG. 4 is an enlarged detail of the showing of FIG. 3 indicating the relationship of the indexing components to the raised-rim hub and fittings.

FIG. 4 shows a detail of the internal wheel assembly 21 centered with reference to spindle 5. The assembly 21' (not shown) is similarly centered on the reverse side of the cassette. The internal wheel assemblies are designed relative to the cassette housing so that a clearance always exists between all circular peripheries of the internal cassette components, regardless of the locus of wheel assemblies 21, 21'. The degree of clearance is governed in each case by the ratio of the diameter of annulus 33 to the diameter of disk 39. Thus, the present design maintains this floatation feature which characterizes most of the cassettes of this type presently on the commercial market. In the disclosed design the only frictional load imposed on the index system by the hair springs 24, 24' is that necessary to maintain a meshing relation between gear teeth 39 and 34, which is transmitted directly to spindles 5 of the recording-reproducing device 7. The latter, which may take the form of any conventional machine, is designed to readily accommodate this relatively light load.

The drawings and disclosure of my index system have been set forth in specific relation to an audio cassette for use in connection with a pinch-roller type design to assure precise tape speed. It will be apparent to those skilled in the art that the system herein disclosed, employing meshed gears, overcomes the variation in angular velocity of the reels due to tape build-up and reduction. Accordingly, it is apparent that such an index system is readily adapted for use with a tape drive system of the digital type with governed motor speeds. For example, a device of this type is the Series 1000 cassette tape transport manufactured by Ross Controls of Newton, Massachusetts, and described in detail in an article entitled "Audio cassettes become digital with novel reel-to-reel drive", page 38 et seq., *Product Engineering*, July 1973, Vol. 44, No. 7, Morgan-Grampian, Inc., New York, New York.

It will be understood that the present invention is not limited to the specific form described in detail by way of illustration, but may take any form in the purview of the appended claims. For example, it will be understood that in an alternative design, the indexing faces 50, 50', instead of protruding above and below the respective upper and lower surfaces of the rear of the conventional cassette, can be confined therein. Thus, the entire system can be confined within a cassette thickness of 0.38 inch. This is made possible by substantially reducing the thickness of the disk gear 38 so that translucent face 50, bearing internal spiral grooves 47, is flush with the rear of the major outer surface of the cassette. The translucent face 50 is preferably made of a frictional snap fit extending over the fixed annular rim 33, rotatable in the plane of the major surface of the cassette to enable the operator to readily synchronize the markings on the index face with audio recordings on the tape, if the same get out of phase because of rough handling of the cassette.

In such a modification, the hair spring 24 of FIG. 2, which is designed to bear against the central opening of disk 38, is replaced by a leaf spring, one end of which is fixed to a projection on the conventional drive hub 3 and the other end of which bears against an inwardly projecting annular flange formed on disk 38. In accordance with a further modification, the tape wound reel 16, instead of resting directly on the floor of housing half 9, is supported on a series of six symmetrically spaced radial ribs formed integrally with the floor of the housing, which project outwardly from the fixed annular rim 30. The other side of the cassette would be correspondingly modified.

Particular advantages of an indexing system of the disclosed design are that it may be totally contained within the dimensions of the conventional Phillips tape cassette and can be used on any conventional tape recording-reproducing machine. The translucent cover totally encloses the index mechanism against dust and erasure crumbs. The internal annular disk gear, having a lesser number of teeth than the ring gear, provides a gear ratio which corresponds to the ratio between the spiral marking path on the indicator face and the entire tape length. This provides an index system having an expanded resolution to a degree unknown in prior art tape cassette systems.

The present invention may take any form within the purview of the appended claims.

What is claimed is:

1. In a system comprising at least one reel mounted in fixed axial relation in a housing, and constructed in response to driving means to rotate in one direction or the other for rolling up or unrolling a length of tape, said reel provided with a hub, an indexing system for indicating the precise position of information recorded on the said tape, said indexing system comprising:

a fixed rim integral with a face of said housing, substantially concentric with said reel and having a central opening at least large enough to accommodate the hub of said reel, an annular disk rotatably accommodated within said rim and constructed for slight lateral movement relative to the axis of said rim, said disk having a circular central opening slightly larger than the outer diameter of said hub and an outer periphery of slightly smaller diameter than the inner diameter of said fixed rim, resilient bearing means coupled in fixed relation to said hub and constructed to bear against the central opening of said annular disk and to move slidably thereafound in response to rotation of said hub about its longitudinal axis, said resilient bearing means constructed to cause the outer periphery of said disk to rotate oppositely in progressively meshed relation against an interior surface of said fixed rim, said annular disk having a radial slot, indicator means comprising a body portion and a projection substantially normal to said body portion, the body portion of said indicator means constructed to move slidably in said slot upon rotation of said disk, an indicator face disposed in a plane substantially parallel to the plane of said fixed rim and constructed to be frictionally maintained in fixed angular relationship to said fixed rim upon rotation of said disk, said projection constrained upon rotation of said disk to move in a spiral path adjacent a major under surface of said indicator face whereby the position of said projection is visible on said indicator face to indicate the degree of rotation of said disk relative to said fixed rim.

2. The combination in accordance with claim 1 wherein said face comprises a spiral groove commencing at a position adjacent to said fixed rim and extending inwardly along said plane substantially centered on the central opening of said housing, and wherein said projection engages and rides in said spiral groove upon rotation of said annular disk, the position of said projection being visible on said indicator face to indicate the degree of rotation of said disk relative to said fixed rim.

3. The combination in accordance with claim 1 wherein said resilient bearing means constructed to bear against said central opening of said disk comprises a spring.

4. The combination in accordance with claim 3 wherein said fixed rim has inwardly directed teeth, and said annular disk has peripheral teeth slightly less in number than the teeth of said fixed rim, and portions of said teeth are held in the progressively meshing relation by the compression of said spring, causing a backward rotation of said annular disk relative to said fixed rim at a rate which is related to the rate of rotation of said reel by the gear ratio between said fixed rim and said annular disk.

5. The combination in accordance with claim 2 wherein the groove in which said projection rides is formed on the undersurface of said indicator face, and the portion on the outersurface of said indicator face conforming to the path of said groove is transparent, and the portion of said outer face adjacent said transparent portion comprises an erasable medium constructed to receive visible marks corresponding to audio recording points on said tape.

6. The combination in accordance with claim 5 wherein said indicator face comprises a rimmed cover constructed to snap fit over said fixed rim in concentric relation thereto, said indicator face being rotatably movable manually relative to said fixed rim for synchronizing markings on said indicator face with audio indications at preselected positions on said tape.

7. The combination in accordance with claim 3 wherein said resilient bearing means coupled in fixed relation to said hub and constructed to bear against the central opening of said annular disk comprises a leaf spring.

8. The combination in accordance with claim 4 wherein the length of said spiral groove and the overall length of said tape is a substantially fixed function of the gear ratio between the teeth of said fixed rim and said annular disk, thereby determining the degree of resolution of said indexing system.

9. In a system comprising a magnetic tape cassette comprising a pair of reels mounted with their axes fixed in spaced apart relation in a housing, the said reels equipped with hubs respectively constructed for engagement with a pair of spindles of a magnetic tape recording and reproducing machine for unrolling a length of magnetic tape from one said reel and simultaneously rolling up a corresponding length of magnetic tape on the other said reel, an indexing system for indicating the precise position of information recorded on said tape, said indexing system comprising a pair of fixed rims disposed in off-set relation on each of the two opposite major surfaces of said housing, each said rim substantially concentric with one of said reels and having a central opening at least large enough to accommodate the hub of said reel, an annular disk accommodated within each of said rims having a circular central opening slightly larger than the outer diameter of said hub and an outer peripheral diameter slightly smaller than the inner diameter of said rim, resilient bearing means coupled in fixed relation to each of said hubs and constructed to bear against the respective central openings of said annular disks, and to move slidably therearound in response to rotation of said respective hub about its longitudinal axis, said resilient bearing means constructed to cause the outer periphery of each said disk to rotate oppositely in progressively meshed relation against the inner periphery of each said fixed rim, each said annular disk having a radial slot, a pair of indicator means, each comprising a body portion and a projection substantially normal to said body portion, the body portion of each said indicator means constructed to move slidably in a respective one of the slots in said rotating disks, a pair of indicating faces respectively disposed in planes substantially parallel to said fixed rims adjacent opposite major surfaces of said cassette housing, each said projection respectively constrained upon rotation of the associated disk to move in a spiral path relative to the surface of a respective one of said indicating faces, whereby the position of each of said projections is visible on the respective indicator face to indicate the degree of rotation of the associated disk relative to its fixed rim.

10. The combination in accordance with claim 9 wherein each said resilient bearing means constructed to bear against the edge of the central openings of each of said disks comprises a spring.

11. The combination in accordance with claim 10 wherein the indicator faces adjacent opposite major surfaces of said housing each comprise an annulus substantially concentric with the axis of a respective one of said reels, and each constructed to be maintained in fixed angular relationship to a respective one of said rims upon rotation of said reels, each said annulus including a spiral groove commencing at a position adjacent the outer edge thereof and terminating at a position adjacent the central opening thereof, and each said projection engaging, and upon rotation of the respective annular disks, riding in its corresponding spiral groove, the position of each said projection in said spiral groove being respectively visible on the corresponding one of said indicator faces to indicate the degree of rotation of each of said disks relative to its respective rim.

12. The combination in accordance with claim 11 wherein each said outer rim has inwardly directed teeth, and said annular disk has peripheral teeth slightly less in number than the teeth of said fixed rim, and said teeth are held in progressively meshing relation by the compression of said spring, causing a backward rotation of each of said annular disks relative to its respective fixed rim at a rate which is related to the rate of rotation of said reels by the gear ratio between each said fixed rim and its respective annular disk.

13. The combination in accordance with claim 11 wherein the groove in which each said projection rides is formed on the undersurface of each of said indicator faces, the portion of the outer face of each corresponding to the path of the respective groove being transparent, and the portion of each outer face adjacent said transparent portion comprising a surface constructed to receive visible marks of an erasable or removable medium.

14. The method of providing indexing means on an indicator face of a tape cassette housing which comprises using a tape reel for indicating the precise position of information recorded on said tape, said reel having a hub mounted for rotation in one direction or the other about a relatively fixed axis with respect to said housing for rolling up or unrolling a length of tape, said method comprising:

providing on said housing a fixed rim substantially concentric with said reel, accommodating an annular disk within said rim for rotation in the principal plane of said rim so that said disk is capable of slight lateral motion in said plane relative to the axis of said fixed rim, providing said annular disk with a central opening slightly larger than the outer diameter of said hub and with an outer periphery slightly smaller than the inner periphery of said rim, continuously pressing the outer periphery of said annular disk into progressively meshing relationship with the inner periphery of said rim in coordination with the rotation of said hub about its longitudinal axis, providing said cassette housing with an indicator face located in a plane parallel to and adjacent said fixed rim and arranged to remain in fixed concentric relation with said rim upon rotation of said reel, providing in said indicator face a spiral groove concentric with the principal axis of said rim, providing in said annular disk a radial slot, interposing an indicator body in said slot which is constructed for slidable motion in said slot upon rotation of said reel, and providing said indicator body with a projection which simultaneously engages and moves progressively in said spiral groove in a manner visible on said indicator face and coordinated with the rotation of said reel for indicating the precise position of said tape with reference to preselected marks on said indicator face.

15. The method in accordance with claim 14 which comprises rigidly coupling a leaf spring to the hub of said reel for continuously bearing in slidable relation on the inner opening of said disk in coordination with the rotation of said hub.

16. The method in accordance with claim 14 which comprises providing said fixed rim with a given number of internally directed teeth, and said fixed annular disk with a slightly smaller number of externally directed teeth, and operating said annular disk relative to said rim as a pinion gear rolling against an internal ring gear.

17. The method in accordance with claim 14 which comprises constructing said indicator face of plastic in the form of a rimmed cap which is snap-fitted over fixed rim, said spiral groove being formed on the undersurface of said face, the portion of said outer indicator face conforming to said groove being of transparent plastic, and the portion of said outer indicator face adjacent and between said transparent portions being textured to receive erasable markings corresponding to recorded audio signals on said tape.

* * * * *